(12) United States Patent
Rule et al.

(10) Patent No.: US 8,763,231 B2
(45) Date of Patent: Jul. 1, 2014

(54) BLIND FASTENERS

(75) Inventors: Joseph D. Rule, Cottage Grove, MN (US); Kevin M. Lewandowski, Inver Grove Heights, MN (US); Jason D. Clapper, Lino Lakes, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 327 days.

(21) Appl. No.: 13/260,581

(22) PCT Filed: Apr. 7, 2010

(86) PCT No.: PCT/US2010/030160
§ 371 (c)(1),
(2), (4) Date: Sep. 27, 2011

(87) PCT Pub. No.: WO2010/118082
PCT Pub. Date: Oct. 14, 2010

(65) Prior Publication Data
US 2012/0017422 A1 Jan. 26, 2012

Related U.S. Application Data

(60) Provisional application No. 61/168,342, filed on Apr. 10, 2009, provisional application No. 61/175,485, filed on May 5, 2009.

(51) Int. Cl.
*B23P 11/02* (2006.01)
*F16B 1/00* (2006.01)
(52) U.S. Cl.
CPC ................................. *F16B 1/0014* (2013.01)
USPC ............................................. 29/447; 403/297

(58) Field of Classification Search
USPC ............... 29/525.05, 525.03, 525.04, 525.13, 29/428, 447, 448, 481; 403/297; 411/82.5
See application file for complete search history.

(56) References Cited

U.S. PATENT DOCUMENTS

| | | | |
|---|---|---|---|
| 2,458,152 | A | 1/1949 | Eakins |
| 4,436,858 | A | 3/1984 | Klosiewicz |
| 4,469,357 | A | 9/1984 | Martin |
| 4,832,382 | A | 5/1989 | Kapgan |
| 4,872,713 | A | 10/1989 | Kapgan |
| 5,145,935 | A | 9/1992 | Hayashi |
| 5,155,199 | A | 10/1992 | Hayashi |
| 5,506,300 | A | 4/1996 | Ward et al. |
| 5,665,822 | A | 9/1997 | Bitler et al. |
| 6,160,084 | A | 12/2000 | Langer et al. |

(Continued)

FOREIGN PATENT DOCUMENTS

| | | |
|---|---|---|
| CN | 101126473 | 2/2008 |
| EP | 0 296 003 | 12/1988 |

(Continued)

OTHER PUBLICATIONS

Irie, "Shape Memory Polymers," Shape Memory Materials, Chapter 9, pp. 203-219, Cambridge University Press 1998.

(Continued)

*Primary Examiner* — John C Hong
(74) *Attorney, Agent, or Firm* — Kent S. Kokko (57) ABSTRACT

Fasteners for producing double blind joints where the fastener is not visible or accessible are provided. The fasteners comprise a shape memory polymer that may be used to fasten workpieces by heating the fasteners, inducing recovery of the original, permanent shape of the fasteners.

20 Claims, 2 Drawing Sheets

(56) References Cited

U.S. PATENT DOCUMENTS

| | | |
|---|---|---|
| 6,388,043 B1 | 5/2002 | Langer et al. |
| 7,173,096 B2 | 2/2007 | Mather et al. |
| 7,516,990 B2 | 4/2009 | Jamison et al. |
| 2001/0015462 A1 | 8/2001 | Powell |
| 2003/0170092 A1 | 9/2003 | Chiodo et al. |
| 2005/0244353 A1 | 11/2005 | Lendlein et al. |
| 2006/0041089 A1 | 2/2006 | Mather et al. |
| 2007/0009465 A1 | 1/2007 | Lendlein et al. |
| 2008/0201914 A1 | 8/2008 | Turner et al. |

FOREIGN PATENT DOCUMENTS

| | | |
|---|---|---|
| JP | 60081572 | 5/1985 |
| JP | 2163594 | 6/1990 |
| JP | 3265784 | 11/1991 |
| JP | 4282093 | 10/1992 |
| JP | 06-63907 | 9/1994 |
| JP | 07126125 | 5/1995 |
| JP | 2505568 | 6/1996 |
| JP | 2959775 | 7/1999 |
| JP | 2006242285 | 9/2006 |
| WO | WO 03/084489 | 10/2003 |
| WO | WO 03/093341 | 11/2003 |
| WO | WO 2008/129245 | 10/2008 |

OTHER PUBLICATIONS

Gorden, "Applications of Shape Memory Polyurethanes," Proceedings of the First International Conference on Shape Memory and Superelastic Technologies, SMST International Committee, pp. 115-120, (1994).

Kim et al., "Polyurethanes having shape memory effect," Polymer, vol. 37, Issue 26, pp. 5781-5793, (1996).

Li et al., "Crystallinity and Morphology of Segmented Polyurethanes with Different Soft-Segment Length," Journal of Applied Polymer Science, vol. 62, Issue 4, pp. 631-638, (1996).

Takahashi et al., "Structure and Properties of Shape-Memory Polyurethane Block Copolymers," Journal of Applied Polymer Science, vol. 60, Issue 7, pp. 1061-1069, (1996).

Tobushi, et al., "Thermomechanical Properties of Shape Memory Polymers of Polyurethane Series and their Applications," Journal de Physique IV, Colloque C1, supplement au Journal de Physique III., vol. 6, pp. 377-384, (1996).

Yakacki et al., "Strong, Tailored, Biocompatible Shape-Memory Polymer Networks," Advanced Functional Materials, vol. 18, pp. 2428-2435, (2008).

Safranski et al., "Effect of chemical structure and crosslinking density on the thermo-mechanical properties and toughness of (meth) acrylate shape memory polymer networks," Polymer, vol. 49, pp. 4446-4455, (2008).

BLIND FASTENERS

CROSS REFERENCE TO RELATED APPLICATIONS

This application is a national stage filing under 35 U.S.C. 371 of PCT/US2010/030160, filed Apr. 7, 2010, which claims priority to Provisional Application No. 61/168,342, filed Apr. 10, 2009, and claims priority to Provisional Application No. 61/175,485, filed May 5, 2009, the disclosure of which is incorporated by reference in its/their entirety herein.

FIELD OF THE INVENTION

The present invention is directed to fasteners for producing blind joints where the fastener is not visible or accessible. The fasteners comprise a shape memory polymer that may be used to fasten two workpieces by heating the fasteners.

BACKGROUND

There are many situations where it is required to permanently or semi-permanently connect two workpieces where there is access to only one side of the assembly. Examples include the attachment of panels or plates to underlying frames or supports in structures such as aircraft, ships, cars, etc. Arrangements such as captive bolts, blind rivets, rivet nuts etc., may be used in such applications. There are however disadvantages with such arrangements. For example, with rivets and captive nuts, the surface of the panel is interrupted by the head of the rivet or bolt.

Sometimes it is necessary to produce blind joints. A blind joint is a joint where, after the joint has been assembled, the fastener is not visible and/or accessible to observers without damage to the fastener and/or the workpiece, although the fastener may be visible if the workpiece is transparent. These joints are preferred over other types of joints because they hide the appearance of the actual joint itself. Mechanical fasteners, such as nails and screws, can also be used to create joints. Mechanical fasteners are generally easy to use (they require little or no skill), and can be used to produce joints quickly. However, mechanical fasteners by themselves cannot be used to create blind joints. In other words, after a joint has been assembled using mechanical fasteners, those mechanical fasteners are generally exposed and visible. On some pieces, for example, high-quality furniture and trimwork, the appearance of exposed mechanical fasteners such as nails and screws is inappropriate. In other applications, such as electronic circuitry and computer components, the small size and complexity often requires the use of blind joints to fasten the component parts.

Blind joints currently exist, but prior art blind joints require expensive tools, jigs, or fixtures, and are usually difficult to make. Some examples of existing blind joints in furniture and other industries include the mortise-and-tenon joint, half-blind dovetail joint, double-blind dovetail, a dowel joint and a biscuit joint. Another blind joint includes a dowel fastener used in furniture manufacture in which a dowel is inserted into adjoining parts and secured by compression and/or adhesives.

As well known in the prior art, these joints require either considerable machining and skill, in the case of the mortise-and-tenon joint, half-blind dovetail joint, and the double-blind dovetail, or expensive jigs and fixtures, specialized tools and adhesives, in the case of the dowel joint and the biscuit joint.

In addition to the specialized tools, considerable skill is also required to properly make the joints. They also require a considerable amount of time to lay out and prepare the various tools to make the appropriate cuts for these joints. So these prior art joints are time-consuming in two ways: an artisan would require time to practice and develop the necessary skills to produce the joints, and once the artisan has learned the craft of making the joint, actually making the joint itself and, often, allowing the adhesive to cure is time-consuming.

SUMMARY

Accordingly, the present invention is directed to a fastener for producing a blind joint that substantially obviates one or more of the limitations and disadvantages of the related art. The present disclosure provides a fastener that can join two opposed items to provide a blind joint, meaning that the fastener itself is not accessible without damaging the workpiece(s) or fastener after the joint has been formed. Further, the fastener is generally not visible along the longitudinal axis of the fastener, unless the workpieces are transparent. The present disclosure further provides a fastener that is easy to install, requires little skill, and allows two opposed items to be joined quickly.

The present disclosure provides a method of making blind joints comprising providing two workpieces each having a cavity with an opening on the surface thereof; inserting a fastener into the respective cavities, wherein the fastener comprises a shape memory polymer; and heating the blind fastener so that the fastener expands laterally and shrinks axially to engage the surfaces of the cavities and hold the two workpieces together. The fastener also contracts or shrinks axially, along the longitudinal axis of the fastener so that the two workpieces are drawn together.

Briefly, the present disclosure provides an assembly comprising first and second workpieces fastened in a blind joint by an inaccessible shape memory polymer fastener. More particularly, the present disclosure further provides an assembly comprising first and second workpieces fastened in a blind joint by an inaccessible shape memory polymer fastener. The workpieces are securably fastened by means of the recovery of the shape memory polymer in response to heat, in which the fastener expands laterally to engage the cavities of the workpieces, and contracts or shrinks along the longitudinal axis so that the respective faces are drawn together in a blind joint. Additional workpieces may also be inserted between the first and second workpieces, the additional workpieces having through-holes.

The present disclosure further provides an assembly comprising first and second workpieces fastened in a blind joint, each workpiece having a cavity defining an opening in a surface of each workpiece, and further wherein each cavity includes cavity surfaces; and a shape memory polymer fastener securably affixed to at least a portion of each of the cavities.

The present disclosure further a method of forming an attachment between at least two workpieces, wherein each of the two workpieces contains a cavity having interior surfaces and an opening in a surface of each workpiece, the method comprising the steps of placing an oriented shape memory polymer fastener having a first deformed shape into at least a portion of each of the cavities, and heating at least a portion of the shape memory polymer fastener thereby to recover the shape memory polymer fastener to an original, permanent shape, whereby the shape memory polymer expands laterally into mating engagement with the surfaces of the cavities, thereby securably affixing the workpieces to each other. The method results in a blind joint between the surfaces of the workpieces.

Shape memory polymers (SMPs) have the unique ability to "remember" an original, permanent shape and, upon exposure to the appropriate stimuli, shift from a deformed or altered shape back to the permanent shape. Several commercially important uses have been developed for shape memory polymers. For example, shape memory polymers are commonly used in various medical, dental, mechanical, and other technology areas for a wide variety of products.

DETAILED DESCRIPTION

The present disclosure provides a fastening system and a method of fastening for blind joints.

Shape memory polymers are known to have the unique ability to be set in a pre-set shape, deformed to an altered shape, and then revert back to the pre-set shape when exposed to the appropriate stimuli (e.g., changes in temperature, application of solvent, etc.). Because the fasteners disclosed herein comprise a shape memory polymer, the portion of the article (or the entire article if made completely from a shape memory polymer) having the shape memory polymer can be configured to utilize this property. For example, the fastener article may include a shape memory polymer surface that has been cast or otherwise shaped to have a permanent shape or configuration. This surface can be deformed to an altered or deformed shape and then be shifted back or recovered to the permanent shape when appropriately triggered. Triggering the shift from the deformed shape to the permanent shape can vary depending on the particular polymer used or other parameters. However, at least some of the shape memory polymers disclosed herein can be shifted by exposure to elevated temperatures and/or to an appropriate solvent.

Shape memory polymers can be classified as elastomers. On the molecular level they represent polymer networks that include segment chains that are connected by netpoints. The netpoints can be formed by entanglements of the polymer chains or intermolecular interaction of certain polymer blocks. These cross-links are called physical netpoints. Crosslinks in the form of covalent bonds form chemical netpoints. An elastomer exhibits a shape-memory functionality if the material can be stabilized in the deformed state in a temperature range that is relevant for the particular application. This can be achieved by using the network chains as a kind of molecular switch. For this purpose, it should be possible to limit the flexibility of the segments as a function of temperature. This process is supposed to be reversible. The ability to incorporate a control function into the material provides a thermal transition $T_{trans}$ of the network chains in the temperature range of interest for the particular application. At temperatures above $T_{trans}$ the chain segments are flexible, whereas the flexibility of the chains below this thermal transition is at least partially limited. In the case of a transition from the rubber-elastic, i.e., viscous, to the glassy state the flexibility of the entire segment is limited.

Without being bound to theory, it is believed that the copolymer network includes an elastomeric phase or component and a "glassy" or high glass transition temperature phase or component. The glassy phase holds or constrains the elastomeric component so that the substrate can be deformed into and stays in the deformed shape. Shifting from a deformed shape to the original or permanent shape generally includes mobilizing the glassy phase of the shape memory polymer in order to allow the elastomeric component to "spring back" or otherwise shift to the original permanent shape. According to this theory, mobilizing is understood to be the mobilization of the glassy phase through the application of the appropriate external stimuli.

SMPs have a defined melting point ($T_m$) or glass transition temperature ($T_g$). Collectively, the melting point ($T_m$) or glass transition temperature ($T_g$) will be referred to as the transition temperature or $T_{trans}$. Above the $T_{trans}$ the polymers are elastomeric in nature, and are capable of being deformed with high strain. The elastomeric behavior of the polymers results from either chemical crosslinks or physical crosslinks (often resulting from microphase separation). Therefore, SMPs can be glassy or crystalline and can be either thermosets or thermoplastics.

The permanent shape of the SMP is established when the crosslinks are formed in an initial casting or molding process. The SMP can be deformed from the original shape to a temporary shape. This step is often done by heating the polymer above its $T_{trans}$ and deforming the sample, and then holding the deformation in place while the SMP cools. Alternatively, in some instances the polymer can be deformed at a temperature below its $T_{trans}$ and maintain that temporary shape. Subsequently, the original shape is recovered by heating the material above the melting point or glass transition temperature.

The recovery of the original shape, which may be induced by an increase in temperature, is called the thermal shape memory effect. Properties that describe the shape memory capabilities of a material are the shape recovery of the original shape and the shape fixity of the temporary shape. The advantages of the SMPs will be closely linked to their network architecture and to the sharpness of the transition separating the rigid and rubber states. SMPs have an advantage of capacity for high strain: to several hundred percent.

Any shape memory polymer may be used in the preparation of the fastener. In some embodiments the shape memory polymer composition may be cast into a permanent shape and deformed to a temporary shape at a temperature below the $T_{trans}$ so the deformed temporary shape is retained. Alternatively, the shape memory polymer composition may be cast into a permanent shape, deformed at a temperature above the $T_{trans}$, and then cooled to a temperature below the $T_{trans}$ so the deformed temporary shape is retained. With either deformation method, when the deformed article is heated above the $T_{trans}$ the deformed article will elastically recover the permanent shape.

Useful SMPs may be physically or chemically crosslinked. Chemically crosslinked, thermoset shape memory polymers are preferred. Examples of suitable physically crosslinked SMP include, but are not limited to, linear block copolymers, such as thermoplastic polyurethane elastomers with hard segment as permanent shape and soft segment as switching temporary shape. Multiblock copolymers can also serve as SMP, such as polyurethanes with a polystyrene and poly(1,4-butadiene), ABA triblock copolymers of poly(tetrahydrofuran) and poly(2-methyl-2-oxazoline), polynorbornene, polyhedral oligomeric silsesquioxane (POSS)-modified polynorbornene, and PE/Nylon-6 grafted copolymer.

Examples of polymers that have been utilized in hard and soft phases of shape memory polymers include polyurethanes, polynorbornenes, polyethers, polyacrylates, polyamides, polysiloxanes, polyether amides, polyether esters, trans-polyisoprenes, polymethylmethacylates, cross-linked trans-polyoctylenes, cross-linked polyethylenes, crosslinked polyisoprenes, cross-linked polycyclooctenes, inorganic-organic hybrid polymers, copolymer blends with polyethylene and styrene-butadiene co-polymers, urethane-butadiene co-polymers, PMMA, polycaprolactone or oligo caprolactone copolymers, PLLA or PL/D LA co-polymers, PLLA PGA co-polymers, and photocrosslinkable polymers including azo-dyes, zwitterionic, and other photochromatic materials such as those described in "Shape Memory Materials" by Otsuka and Wayman, Cambridge University Press 1998, the entire contents of which are incorporated herein by reference. Examples of suitable chemical crosslinked shape-memory polymers include, but are not limited to, HDPE, LDPE, copolymer of PE and polyvinyl acetate.

Suitable shape memory polymers include but are not limited to those described in WO 03/084489; U.S. Pat. No. 5,506,300 (Ward et al.), U.S. Pat. No. 5,145,935 (Hayashi), U.S. Pat. No. 5,665,822 (Bitler et al.), and Gorden, "Applications of Shape Memory Polyurethanes," *Proceedings of the First International Conference on Shape Memory and Superelastic Technologies*, SMST International Committee, pp. 115-19 (1994); U.S. Pat. No. 6,160,084 (Langer), U.S. Pat. No. 6,388,043 (Langer), Kim, et al., "Polyurethanes having shape memory effect," *Polymer* 37(26):5781-93 (1996); Li et al., "Crystallinity and morphology of segmented polyurethanes with different soft-segment length," *J Applied Polymer* 62:631-38 (1996); Takahashi et al., "Structure and properties of shape-memory polyurethane block polymers," *J. Applied Polymer Science* 60:1061-69 (1996); Tobushi H., et al., "Thermomechanical properties of shape memory polymers of polyurethane series and their applications," *J Physique IV* (Colloque C1) 6:377-84 (1996)), the contents of which are incorporated by reference herein in their entirety. Other SMPs are described in U.S. Pat. No. 5,155,199 (Hayashi), U.S. Pat. No. 7,173,096 (Mather et al.), U.S. Pat. No. 4,436,858 (Klosiewicz), JP 07126125, JP 2959775, U.S. 2005/244353 (Lendlein et al.), and U.S. 2007/009465 (Lendlein et al.), the disclosure of which are hereby incorporated by reference herein. Acrylic SMP are disclosed in U.S. 2006/041089 (Mather et al.), C. M. Yakachi et al., in *Advanced Functional Materials*, 18 (2008), 2428-2435, and D. L. Safranski et al., in *Polymer* 49 (2008) 4446-4455.

Commercially available thermoplastic SMPs include, but are not limited to, polyacrylates such as the PMMA and JTbu series (PolymerExpert), cycloaliphatic polyutherurethane Tecoflex (TFX) (Noveon), polyurethane foam of polyether polyol series—Diary, including the MM type, MP type, MS type and MB (microbead powder) type series (Diaplex Co. Ltd.)., "Calo-MER" from the Polymer Technical Group, elastic memory composite ("EMC") from Composite Technology Development, Inc. or "Veriflex" from Cornerstone Research Group ("CRG").

Generally, the SMP is chosen such that the $T_{trans}$ is at a temperature suitable for fastening workpieces, and above any temperatures to which the fastened workpieces might be expected to be exposed. In some embodiments the $T_{trans}$ is at least 50° C., at least 100° C., or at least 125° C. Generally the shape memory polymer will have an elastic modulus of at least 0.5 MPa at 80° C.

The SMP fasteners may be prepared from the shape memory polymer compositions by any suitable technique used for thermoplastic or thermoset polymers. The shaped articles may be cast into a suitable mold and cured, or injection molded, such as by reaction injection molding (RIM) whereby the polymer composition is injected into a mold and cured. Alternatively, in the case of thermoplastic polymers, the articles may be extruded.

The permanent and deformed shapes of the SMP fasteners and are generally rod-like, having length and a width, and having no head, as in rivets. The preferably molded shape of the fastener is nominally cylindrical having a circular cross section and a preselected length. Other cross sections are also contemplated such as square, rectangular, higher polygons and ovoid. In some embodiments the SMP fastener may further include longitudinal grooves or ridges on the surface of the cylinder to accommodate insertion into the preformed openings of the cavities and subsequent expansion. The fastener is preferably rod shaped and solid, rather than hollow.

The original molded shape and size of the fastener are chosen such that the fastener (having preselected deformed shape) may be inserted into the cavities of the workpieces, heated to trigger the recovery of the shape memory polymer so that the workpieces are held securably affixed. Heating of the oriented fastener causes the fastener to expand laterally (in width) and shrink in length. By "securably affixed" it is meant that the two workpieces cannot be normally separated without damaging the workpieces or fasteners. However, the workpieces may be separated by heating the fastener above the transition temperature ($T_{trans}$) so the fastener becomes flexible.

In one embodiment the SMP is first formed into a nominal rod-like shape, then deformed to a temporary shape having a width and length suitable for insertion into the cavities of the workpieces. When heated, or otherwise triggered to recover the permanent shape, the SMP of the fastener expands to exert lateral pressure on the cavity surfaces and/or openings of the workpiece.

A suitable mold may be flexible or rigid. Useful materials for the mold include metal, steel, ceramic, polymeric materials (including thermoset and thermoplastic polymeric materials), or combinations thereof. The materials forming the mold should have sufficient integrity and durability to withstand the particular monomer compositions to be used as well as any heat that may be applied thereto or generated by the polymerization reaction. In some embodiments, the mold may comprise an injection mold. In this case, the mold may comprise two halves which mate together. For injection molding, a SMP monomer composition may be injected via an injection port into a cavity or cavities of the mold, and there is typically some output port for air, nitrogen, etc. to escape. Filling of the cavity may be facilitated by vacuum attached via the output port.

To prepare a fastener having shape memory, the fastener can be molded and optionally crosslinked (with the appropriate thermoset SMP) to form a permanent shape. As the fastener is subsequently deformed into a second shape, the fastener can be returned to its original permanent shape by heating the object above the $T_{trans}$. In other embodiments, a solvent such as alkyl alcohol, acetone, etc. can partially dissolve or plasticize the crystalline phase of thermoplastic SMPs and cause the same recovery.

The original formed article, having a first permanent shape, may be deformed into a fastener by either of two methods. In the first, the rod-like article, as molded, is heated above the $T_{trans}$, deformed to impart a temporary shape, then cooled below the $T_{trans}$ to lock in the temporary shape. In the second, the shaped rod-like article is deformed at a temperature below the $T_{trans}$ by the application of mechanical force, whereby the shaped article assumes a second temporary shape through forced deformation; i.e. cold drawing. When significant stress is applied, resulting in an enforced mechanical deformation at a temperature lower than the $T_{trans}$, strains are retained in the polymer, and the temporary shape change is maintained, even after the partial liberation of strain by the elasticity of the polymer.

The formed article may be subsequently deformed in one, two or three dimensions. All or a portion of the shaped article may be deformed by mechanical deformation. The shaped article may be deformed by any desired method including embossing, compression, twisting, shearing, bending, cold molding, stamping, stretching, uniformly or non-uniformly stretching, or combinations thereof. Generally the fastener is formed into a first substantially cylindrical shape and subsequently deformed by axial orientation (stretching). The axial orientation produces a longer and narrower cylinder than that first formed. This may be cut into preselected length suitable for forming a particular blind joint. The first rod-like shaped article may be deformed by axial orientation (stretching) at least 50%, preferably at least 100% and more preferably at least 200%. Such stretching will also result in narrowing from the original width.

The original or permanent shape is recovered by heating the fastener above the $T_{trans}$ whereby the stresses and strains are relieved and the material returns to its original shape. The original or permanent shape of the fastener can be recovered using a variety of energy sources. The fastener (and associated workpieces) can be immersed in a heated bath containing a suitable inert liquid (for example, water or a fluorochemical fluid) that will not dissolve or swell the fastener in either its cool or warm states. The fastener can also be softened using heat sources such as a hot air gun, hot plate, steam, conventional oven, infrared heater, radiofrequency ($R_f$) sources or microwave sources. The composition can be encased in a plastic pouch, syringe or other container which is in turn heated (e.g. electrically), or subjected to one or more of the above-mentioned heating methods.

In some embodiments, the fastener may include a conductive sleeve for facilitating heating and recovery to the permanent shape of the fastener. The sleeve may comprise a material that may be resistively heated or inductively heated. Preferably, the sleeve is in a form that will not retard recovery upon heating, such as a scrim that conforms to the recovered shape of the fastener.

In some embodiments, the fastener may include an elastomeric sleeve for facilitating the sealing of the assembly. After application of heat, and recovery of the fasteners, an elastomeric sleeve can form a seal at the interface of the assembled workpieces and cavities thereof.

Alternatively, the original shape of the fastener may be recovered by exposure to a low molecular weight organic compound, such as a solvent, which acts as a plasticizer. The low molecular weight organic compound diffuses into the polymer bulk, triggering the recovery by disrupting the crystallinity of the thermoplastic SMP.

In some embodiments, it may be desirable to recover only a portion of the fastener. For example, heat and/or solvent can be applied to only a portion of the deformed surface of the substrate to trigger the shape memory recovery in these portions only.

In one embodiment, the fastener may comprise a heating element, such as a resistive heating element encapsulated thereby. The resistive heating element may be in the form of a sleeve. After deformation, the resistive heating element may be connected to a source of electricity imparting heat to the bulk of the polymer, which raises the temperature above the $T_{trans}$ so the deformed article assumes the original permanent shape. The workpieces may have apertures into the cavities to allow the connection of electrical leads. In another embodiment, a hot element, such as a hot needle may be inserted into the fastener by means of an aperture to effect recovery.

In another embodiment, the fastener may have materials for improving the mechanical properties of the fastener such as high tensile materials embedded therein. Such materials may be in the form of fibers or fine wires.

In other embodiments, the heating step may be an indirect heating step whereby the deformed polymer is warmed by irradiation, such as infrared radiation. As the responsiveness of the shape memory polymer is limited by the heat capacity and thermal conductivity, the heat transfer can be enhanced by the addition of conductive fillers such as conductive ceramics, carbon black and carbon nanotubes. Such conductive fillers may be thermally conductive and/or electrically conductive. With electrically conductive fillers, the polymer may be heated by passing a current therethough. In some embodiments, the shape memory polymer may be compounded with conductive fillers, and the polymer heated inductively by placing it in an alternating magnetic field to induce a current. In some embodiments, a conductive filler may be in the form of a core within the fastener.

The workpiece may comprise any material including glass, ceramic, masonry, concrete, natural stone, manmade stone, metals, wood, and plastics. The workpieces have at least one cavity therein, the cavity having an opening on a surface of the respective workpieces. The opening of the cavity may be of any cross-sectional shape such as circular, square, rectangular, higher polygons and ovoid, and preferably is chosen to be consistent with the cross-sectional shape of the fastener. Preferably the opening of the cavity is circular. The width of the cavity is chosen such that the fastener, when heated expands laterally to fill the void between the fastener and the opening and walls of the cavity.

Generally the width of the cavity is 100 to 200% of the width of the fastener—or conversely the width of the fastener is 50 to 100% that of the cavity. The width of the cavity may be constant through the depth, or may vary. In one embodiment the cavity has a first width at the opening of the cavity on a surface of the workpiece, and a second, wider width at a portion of the cavity adjacent the opening. Put another way, the cavity has a first width at the opening, and a second, wider width at a point distal of the opening, such as at a mid-point of the cavity depth or the bottom of the cavity. Advantageously, the fastener will expand laterally into the cavity to the first width at the opening, and expand further into the portion of the cavity at the second width, thereby forming a shoulder to resist pull out. At the same time the fastener with shrink axially engaging shoulders formed at the abutment at the first and second width thereby pulling the two workpieces together. In some embodiments, the cavity may have a first width at the opening, and taper to a wider second width at the distal end of the cavity.

The cavity may be of any suitable depth and each of the cavities has an open end at the opening on a surface of the workpiece and a blind end. The cavity is not a through-hole and may extend up to the thickness of the workpiece. The blind end of the cavity does not allow insertion of the fastener, but may allow insertion of a heating element. Generally the depth of the cavity is from 10 to 90% of the thickness of the workpiece, perpendicular to the plane of the opening.

The second workpiece may have a cavity of the same dimensions or different dimensions. Generally, the cross sectional shape and width are approximately the same, although the depth of each may vary. Generally each cavity has dimensions to securably affix the fastener. Generally the combined depths of the first and second cavities are greater than or equal to the length of the fastener to allow for insertion and longitudinal contraction. Preferably each cavity has a first width at the opening of the respective surfaces, and a second, wider width at that portion of the cavities adjacent the openings.

The first and/or second workpieces may have a small aperture into the cavity extending to a surface of the workpiece for insertion of a heating element. The size and shape of the aperture are such that a resistive heating element (or electrical leads therefore) may be inserted into the fastener, but the width thereof is narrower than that of the fastener. Generally the workpiece has only a single opening of suitable size for insertion of the fastener.

Additional workpieces may also be fastened by the method of this invention. In one embodiment, one or more additional workpieces may be inserted between the first and second workpieces, each having a through-hole therein which allows a fastener to be inserted into the cavity of the first workpieces, through the though-holes of one or more additional optional workpieces, and into the cavity of the second workpiece. The assembly comprising the first and second workpiece and fastener may further comprise one or more additional workpieces each having a through-hole instead of cavities, the through hole has a first opening on a first surface of the additional workpiece(s), a second opening on a second surface thereof, and a channel therebetween. The width thereof is generally the same as that of the cavity of the first workpiece. The fastener may be inserted into the cavity of the first workpiece and through the though-hole or the additional workpieces and into the cavity or the second workpiece.

Heating the fastener results in lateral expansion, and contraction along the longitudinal axis thus fastening the multiple workpieces together. When the fastening has recovered the original permanent shape, the openings and cavities that contain the fastener are no longer accessible. The fastener cannot be accessed without damaging the fastener, and/or the workpieces.

Figure 1:
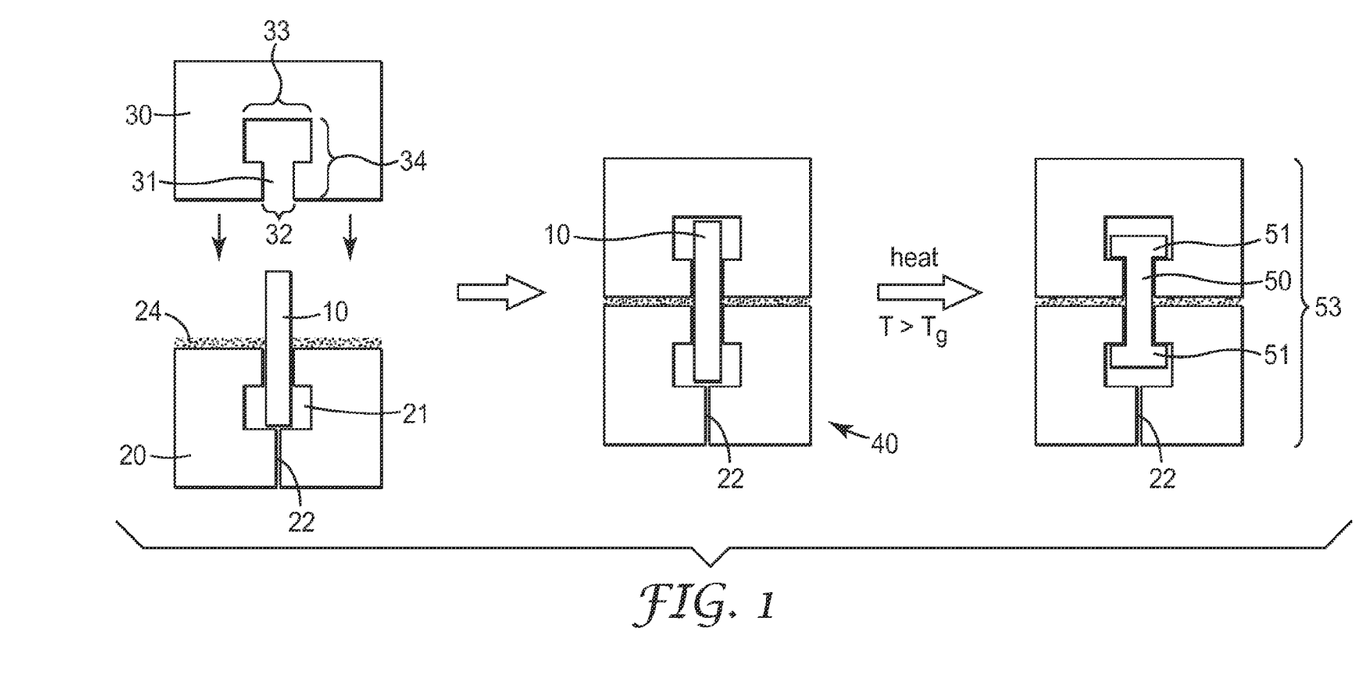
FIGS. 1 and 2 illustrate embodiments of the disclosed method.

Embodiments of the invention are diagrammatically illustrated with reference to the Figures. In FIG. 1 two workpieces, 20 and 30, are illustrated in cross-section, each having a blind cavity 21 and 31 respectively. Blind cavity 31 has first width 32 at the opening on a surface of the workpiece and a larger second width 33 at a portion of the cavity adjacent the opening, distal from the opening. Workpiece 20 may have a first and second width as shown, or may have a constant width through the depth of the cavity. The cavity has a depth 34. Workpiece 20 is further shown with an optional aperture 22 to allow the insertion of a resistive heating element into fastener 10. Workpiece 30 may also be configured with an aperture. The width of the aperture 22 is less than the width of fastener 10.

The depth and width of cavity 21 of workpiece 20 may be the same or different from that of workpiece 30. Generally the cross-sectional shape of the cavities is the same. The fastener 10 is inserted into cavities 21 and 31 and workpieces 20 and 30 are brought together to form article 40. Fastener 10 has a width which is less than or equal to the width at the openings of cavities 21 and 31. Fastener 10 has a length no greater than the sum of the depths of the cavities and a length no less than 75% of the sum of the depths of the cavities 21 and 31.

FIG. 1 also illustrates optional adhesive layer 24, which may be used to adhesively secure workpieces 20 and 30 in a fixed position until secured by fastener 10.

Upon heating to a temperature above the transition temperature, fastener 10 expands laterally to the first width 32 and recovers, in part, the original shape, as constrained by the cavities as illustrated by fastener 50. Since the second width 33 is greater, the fastener 50 will expand further into that portion of the cavity adjacent the opening to form a shoulder 51 at the abutment of the first and second widths which can further retard separation of the workpieces. The fastener will further retract along the axial dimension further compressing the workpieces together.

FIG. 1 further illustrates an assembly 53 comprising a first and second workpiece, fastened in a blind joint by an inaccessible shape memory polymer fastener. The workpieces are securably fastened by means of the recovery of the shape memory polymer in response to heat, in which the fastener expands laterally to engage the surfaces of the cavities, and contracts or shrinks along the longitudinal axis so that the respective surfaces of the workpieces are drawn together in a blind joint. As illustrated, the fastener is inaccessible. Further, the fastener is not visible, except if the workpieces are transparent. Additional workpieces may also be inserted between the first and second workpieces, the additional workpieces having through-holes In FIG. 2, two workpieces, 61 and 71 are provided, each having a blind cavity 62 and 72 respectively. The cavities 62 and 72 may be representative of workpieces or applications having large cavities, such as when forming a joint with a hollow workpieces such as a rectangular tube, or in mounting a workpiece on a hollow wall. Workpiece 61 has an opening on a surface thereof having first width 63 and a second width 64 in a portion of the workpiece adjacent the opening. Cavity 62 has a depth 65. Workpiece 71 may have openings, widths and depths that are the same as workpiece 61 (as shown) or different. Fastener 80 is inserted into the openings of the cavities 62 and 72. Optional additional workpiece 75, having a though-hole, may be inserted between workpieces 61 and 71. One or more additional workpieces may be used, which may be any thickness, and any width and length.

Figure 2:
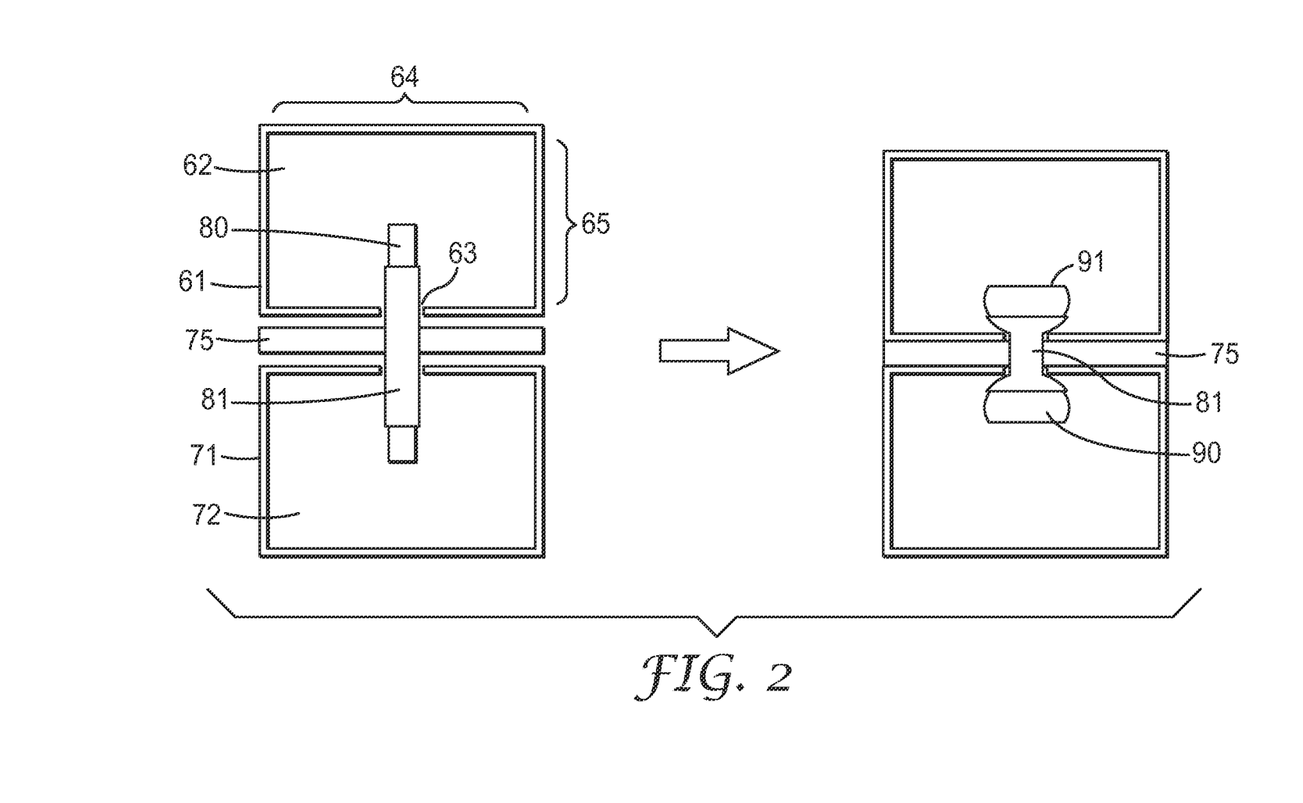

Upon heating to a temperature above the transition temperature, fastener 80 expands laterally to the width of opening 63 and recovers, in part, the original shape, as constrained by the cavities and as illustrated by recovered fastener 90. Since the second width 64 is greater, the shape recovered fastener 90 will expand further that portion of the cavity adjacent the opening to form a shoulder 91 at the abutment of the first and second widths which can further retard separation of the workpieces. The fastener will further retract along the axial dimension further compressing the workpieces together.

FIG. 2 also illustrates an optional sleeve 81, such as a resistive scrim. In the illustrated embodiment, the sleeve 81 conforms to the shape of the fastener 90, as shown. The sleeve may also comprise a non-conformable tube.

FIG. 2 further illustrates an assembly comprising a first and second workpiece, fastened in a blind joint by an inaccessible shape memory polymer fastener. As illustrated with rectangular tube workpieces, the fastener is not accessible, and is not visible when sighted along the axis of the fastener.

EXAMPLES

General Test Methods

Tensile and shear testing was done on a Sintech load frame with a 1000 lbf maximum load cell. Self-tightening grips were used.

Preparatory Example 1

Preparation of W Catalyst Solution

An oven-dried 500 mL flask under nitrogen was charged with $WCl_6$ (2.00 g, 0.005 mol, Sigma-Aldrich, St. Louis, Mo.), and 100 mL of toluene (anhydrous, Sigma-Aldrich, St.

Louis, Mo.). This mixture was stirred for one hour while purging with nitrogen. Nonylphenol (1.1 g, 0.005 mol, Sigma-Aldrich, St. Louis, Mo.) was added via syringe and the solution was stirred for four hours with a nitrogen purge. Using a syringe, 2,4-pentanedione (0.77 g, 0.008 mol, Acros Organics) was then added, and the solution was stirred for 17 h with a nitrogen purge. Anhydrous dicyclopentadiene (250 mL, 1.84 mol, (TCI America containing 4% ethylidene norbornene) was added. The flask was placed in a 60° C. oil bath and vacuum was applied for 1.5 h to remove the toluene (and other volatiles including some dicyclopentadiene). At that point, 106 mL of additional dicyclopentadiene was added to bring the total weight of the solution back up to 247 g, and an additional charge of 2,4-pentanedione (0.77 g, 0.008 mol, Acros Organics) was added.

Preparatory Example 2

Dicyclopentadiene-Ethylidenenorbornene Formulation

An oven-dried 125 mL Erlenmeyer flask was capped with a septum and purged with nitrogen. Using a syringe, dicyclopentadiene (16.9 mL, 0.12 mol), ethylidenenorbornene (30.0 mL, 0.22 mol) and 13.1 mL of the catalyst solution from Preparatory Example 1 were then added. This solution is denoted Mixture 2A.

Irganox 1010 (0.60 g, Ciba Specialty Chemical Corp, Tarrytown, N.Y.) and Irgafos 168 (0.60 g, Ciba) were placed in an oven-dried 125 mL Erlenmeyer flask which was then capped with a septum and purged with nitrogen. Ethylidenenorbornene (45.7 mL, 0.0.34 mol) and Santicizer 261A (12.0 mL, Ferro Corporation, Bridgeport, N.J.) were added. The mixture was stirred for several minutes to dissolve the solids. Diethylaluminumchloride (1.1 mL, 0.009 mol, Sigma-Aldrich, St. Louis, Mo.) was then added. This solution is denoted Mixture 2B.

Preparatory Example 3

Dicyclopentadiene Formulation

An oven-dried 125 mL Erlenmeyer flask was capped with a septum and purged with nitrogen. Using a syringe, dicyclopentadiene (75 mL, 0.55 mol) and 24.6 mL of the catalyst solution from Preparatory Example 1 were then added. This solution is denoted Mixture 3A.

Irganox 1010 (1.94 g, Ciba Specialty Chemical Corp, Tarrytown, N.Y.) was placed in an oven-dried 125 mL Erlenmeyer flask which was then capped with a septum and purged with nitrogen. DCPD (91 mL, 0.67 mol) and butyl ether (1.2 mL, 0.007 mol, from TCI America) were added. 6.1 mL of a 10 vol % solution of diethylaluminumchloride (Sigma-Aldrich, St. Louis, Mo.) in dicyclopentadiene was then added. This solution is denoted Mixture 3B.

Example 1

Tensile Performance of Fasteners 6 mL of Mixture 2A and 6 mL of Mixture 2B were each loaded into 6 mL syringes. The two solutions were injected through a static mixer into a Tygon tube with an inside diameter of 5/16". The sample exothermed in less than two minutes. The resulting polymer rod was removed from the tube and put in a 100° C. oven for approximately 20 minutes to postcure. The final diameter ranged from between 0.28 and 0.30 inches (~7.1-7.6 mm).

Pieces of this sample were heated in a 140° C. oven. While hot, the rods were elongated by hand until the diameter was between 0.17 and 0.18 inches (4.3 to 4.6 mm) Six 1.25 inch (31.75 mm) long pieces of this material were cut. Axial extension was approximately 200%

The smallest face (1"×3/8", approx. 25.4×9.5 mm) of twelve polycarbonate workpieces (3×1×3/8 inches, approx. 76.2×25.4×9.5 mm) was drilled to provide a cavity 5/8 inch deep (15.9 mm) and 3/16 inch (4.8 mm) in diameter. A high speed cutting bit (Dremel #192) was then used to increase the diameter of the hole, in the region that was 1/8 inch (3.2 mm) adjacent from the opening. A fastener was then inserted into the holes of two workpieces to make a butt joint. The assembly was heated in a 138° C. oven for 20 minutes, during which time the fastener recovered (in part) the original molded shape; i.e. decreased in length and increased in diameter. The fastened assembly was tested to failure under tensile loading at 2"/min. The average peak load for six samples was 263 pound force (lbf, aprox. 1170 N) (standard deviation of 32 lbf=142 N).

Example 2

Shear Performance of Fasteners 15 mL of Mixture 2A and 15 mL of Mixture 2B were each loaded into 25 mL syringes. The two solutions were injected through a static mixer into a Tygon tube with an inside diameter of 5/16". The sample exothermed in less than two minutes. The resulting polymer was removed from the tube and put in a 120° C. oven for approximately 10 minutes to postcure.

This sample was cut into 6 inch (152 mm) pieces. Using a load frame, these pieces were heated to 80° C. and stretched over the course of one minute to 180% elongation to impart the deformed shape. The rod-like samples were allowed to cool partially before removing them from the grips of the load frame. After fully cooling, the diameter of the elongated rod fastener was less than 0.21 inch (5.3 mm). Six pieces of this material were cut to 0.44" (11.2 mm) long.

Polycarbonate workpieces (2×1×3/8, approx. 51×25.4×9.5 mm) were drilled to provide a cavity 1/4 inch (6.3 mm) deep and 7/32 inch (0.22 mm) in diameter. The cavity was on the center line of the face of the workpieces 1/2 inch (12.7 mm) from one end. A high speed cutting bit (Dremel #192) was then used to increase the diameter of the cavity, at a region 1/8 inch (3.2 mm) from the opening of the cavity. Two of these polycarbonate workpieces were overlapped such that the holes in their faces were aligned, and an elongated fastener as described in the previous paragraph was inserted into the aligned cavities. The assembly was heated in a 138° C. oven for 20 minutes, during which time the fastener decreased in length and increased in diameter as it recovered (in part) the original, permanent shape.

To allow for shear testing of these fully blind overlap joints, an aluminum coupon (4"×1"×1/16", approx 102×25.4×1.6 mm) was attached to the each end of the polycarbonate assembly using screws. The aluminum coupons were held in the grips of the load frame, and the samples were tested to failure under shear at 2 inches/min (51 mm/min). The average peak load for six samples was 241 lbf (1072 N)(standard deviation of 35 lbf, 156N).

Example 3

Tensile Performance of Fasteners with Steel Reinforcement

Tygon tubing with an inside diameter of 5/16 inch (7.9 mm) was attached at one end to a static mixer. At the other end of the tubing, a 3.5 inch (89 mm) long piece of 0.059 inch (1.5 mm) steel music wire was clamped such that it extended into the tubing along the centerline of the tubing. 6 mL of Mixture 2A and 6 mL of Mixture 2B were each loaded into 6 mL syringes. The two solutions were injected through a static mixer into the Tygon tube. The sample exothermed in less than two minutes. The resulting polymer was removed from the tube and put in a 120° C. oven for approximately 10 minutes to postcure. The resulting sample was a polymer rod with a piece of wire embedded within it.

This sample was cut into 6 inch (152 mm) pieces. Using a Sintech load frame, these pieces were heated to 80° C. and stretched over the course of one minute to 180% elongation to impart a deformed shape. During the stretching, the polymer that was initially over the embedded wire stretched and slid along the wire, as well. The samples were allowed to cool partially before removing them from the grips of the load frame. A portion of the resulting elongated rod had wire embedded within it, and the diameter of this portion of the rod was less than 0.22 inch (5.6 mm). Six pieces of this material with embedded wire were cut to 1.25 inch (31.75 mm) long fasteners.

These fasteners were inserted into the cavities of the polycarbonate workpieces as described in Example 1. The assembly was heated in a 138° C. oven for 20 minutes. The fastened assembly was tested to failure under tensile loading at 2"/min. The average peak load for six samples was 207 lbf (921 N, standard deviation of 20 lbf, 89 N).

Example 4

Shear Performance of Fasteners with Steel Reinforcement

Fasteners with embedded wire as described in Example 3 were cut to 0.44 inch (11.2 mm) in length. These rivets were inserted into the cavities of the polycarbonate workpieces as described in Example 2. The samples were heated in a 138° C. oven for 20 minutes, during which time the fasteners decreased in length and increased in diameter. The fastened assembly was tested to failure at 2"/min. The average peak load for five samples was 251 lbf, approx. 1117 N (standard deviation of 36 lbf, 160N).

Example 5

Assembly with Six Fasteners

A surface measuring approximately 6×0.375 inch (152× 9.5 mm) of polycarbonate workpieces (6"×1.5"×0.375", approx. 152×38.1×9.5 mm) was drilled to provide six cavities spaced one inch apart from each other. The cavities were 0.188 inch (4.8 mm) in diameter and 0.63 inch (16 mm) deep. A high speed cutting bit (Dremel #192) was then used to increase the diameter of the holes only in the portion of the holes between 0.12 inch and 0.38 inch (3 to 9.6 mm) deep adjacent the opening. Six 1.25 inch (31.75 mm) long fasteners identical to those used in Example 1 was inserted into the holes of two of these polycarbonate workpieces. The surfaces of the workpieces were then aligned such that no part of the fasteners were exposed. The assembly was then heated in a 120° C. oven for 20 minutes during which time the fasteners decreased in length and increased in diameter. A shoulder formed in the area of the cavity adjacent the opening.

The resulting assembly was subjected to three-point-bend testing with a support span of 2 inch (51 mm) and a rate of 0.2 inch/minute (approx 5 mm/min) A peak load of 555 lbf (2469 n) was observed. The test was stopped after 0.9 inch (23 mm) of displacement had been reached. One rivet broke during the test, and the others remained unbroken and within both halves of the assembly.

Example 6

Blind Fasteners with Wood and Aluminum

A piece of aluminum rectangular tubing with outside dimensions of 1.5×0.75 inches (38.1×19 mm) and a wall thickness of approximately 0.125 inch (3.2 mm) was cut to 4 inch (102 mm) long. Four cavities 0.188 inch (4.8 mm) in diameter were drilled in one face of the aluminum tube. This provided a cavity having a first width at the opening of 0.188 inch (4.8 mm) and a second width adjacent the opening defined by the volume of the rectangular tubing.

A matching pattern of four 0.188 inch (4.8 mm) diameter cavities was drilled in a 3×2.5×0.5 inch (76.2×63.5×12.7 mm) piece of oak wood, but only to a depth of 0.38 inch (9.7 mm) The diameter of the holes in the wood was increased using a high speed cutting bit (Dremel #192), but only in the portion of the cavities more than 0.12 inch (3 mm) deep. Four fasteners identical to those used in Example 1 were inserted into the cavities in the wood, and the aluminum was placed against the wood such that the fasteners went into the cavity in the aluminum. The assembly was then heated with a heat gun, during which time the fasteners decreased in length and increased in diameter. After cooling, the wood was securely fastened to the aluminum, and no signs of the fasteners were evident on the surface of the wood. Shoulders were formed on the fastener in the portion of the cavity of the aluminum workpiece.

Example 7

Resistive Heating of Fasteners with 0.010" Music Wire

Mixture 3A (12.5 mL) was loaded into a syringe. A separate syringe was loaded with Mixture 3B (12.5 mL). The syringes were loaded into a syringe pump and connected to a static mixer. A single strand of steel music wire (0.010 inches in diameter, approx 0.25 mm) was threaded through a Nalgene tube with an inside diameter of 0.25 inches (6.4 mm) This assembly of wire and tubing was connected to the end of the static mixer and pulled tight to suspend the wire in the center of the tube. Over the course of less than 30 seconds, the two solutions were injected into the flexible tubing and around the wire. The sample exothermed in less than four minutes, and the resulting polymer rod was then removed from the Nalgene tube. The polymer was then put into a 100° C. oven for approximately 20 min. to post cure.

Three portions 4 inch (102 mm) long each were cut from this sample. They were placed in an 80° C. oven that enclosed the grips of a load frame. After equilibrating for 20 minutes, the samples were then individually loaded into the grips with an initial separation of 2 inches (51 mm). The samples were then allowed to re-equilibrate for an additional 2 minutes after loading each sample. Ink marks were placed on some samples at the base of the grips to account for slippage in the grips. The samples were elongated at 2 inch/min (5.1 mm/min) until the grip separation was 5.5 inches (140 mm). The four samples reached a maximum force of between 114 and 143 lbf (507 to 636 n) at between 0.10 and 0.20 inches (2.54 to 5.1 mm) of displacement, at which point they began to neck and increase in elongation with a relatively constant force. After reaching the final orientation, the samples were left for <20 seconds, and then unloaded at 2 inches/min (51 mm). After removing and cooling the samples, the average diameter of the samples had decreased from 6.1 mm to 4.4 mm. The wire had slid within the samples, and in two of the samples, the wire broke in one place.

These samples were cut into pieces 0.75 inches (19 mm) in length each, being careful to only include portions that contained the embedded wire. 1/8 inch (3.2 mm) of polymer was stripped from each end of each sample to leave 1/8 inch (3.2 mm) of wire protruding from each end of a 0.5 inch (12.7 mm) long polymer rivet.

Test substrates were prepared by adhering polycarbonate workpieces (1×1×3/8 inch, approx. 25.4×25.4×9.5 mm) to aluminum workpieces (4×1×1/16 inch, approx. 102×25.4×1.6 mm) with DP 100 epoxy (3M) such that the adhesive bond was a 1×1 inch (25.4×25.4 mm) area on one end of the Al workpiece. The center of the 3/8×1 inch (9.5×25.4 mm) polycarbonate face on the end of the sample was drilled to provide a 3/16 inch (4.8 mm) diameter cavity that was 3/8 inch (9.5 mm) deep. A high speed cutting bit (Dremel #192) was then used to increase the diameter of the hole, but only in the region that was more than 1/16" adjacent the opening (i.e. 3/16 inch (4.8 mm) in diameter at the opening and 1/4 inch (6.35 mm) in diameter adjacent the opening). A 1/16 inch (1.6 mm) aperture was then drilled from the exposed 1×1 inch (25.4×25.4 mm) polycarbonate face to the deepest portion of the cavity. Both ends of fasteners as described above were attached to single-strand copper wires (~1" long, approx 25.4 mm). Each end of these fasteners were then inserted into the 3/16 inch (4.8 mm) cavities of the polycarbonate workpieces, and the copper wire was fed out through the 1/16 inch (1.6 mm) apertures at each end. The copper wire was attached to a single AA battery (1.5 V) for 90 seconds. The fasteners decreased in length and increased in diameter as the wire became hot. After cooling the copper wire was removed from the assembly. Four samples were prepared, and they were tested at room temperature under tension at 2"/min (51 mm/min) Two of the samples failed by pulling out of one of the assemblies, and two assemblies failed through adhesive failure at the aluminum-polycarbonate interface. The average peak load for the four samples was 79 lbf (351 N).

Preparatory Example 4

Photocurable Acrylic Fasteners

Isobornyl acrylate (65 g, Sartomer, Exton, Pa.), tetrahydrofurfuryl acrylate (25 g, Sartomer, Exton, Pa.), difunctional aliphatic urethane oligomer CN9009 (10 g, Sartomer Exton, Pa.), and TPO-L™ photoinitiator (0.33 g, BASF, Mt. Olive, N.J.) were mixed in an amber jar thoroughly with a magnetic stir bar for 1 hour.

Example 8

Tensile Performance of Acrylic Fasteners

Clear plastic tubing with length of 5 inches and an inside diameter of 0.25" was sealed on one end using a clip, filled with the acrylic solution of Preparatory Example 4, and then sealed using a second clip in such a way as to exclude air bubble formation inside the tube. The filled tube was placed horizontally under a LED array (3.80 nm, 100 mW/cm$^2$, 10 min) to photocure the sample. Following polymerization, the plastic tubing was cut away from the resulting polymer rod.

Using a Sintech™ load frame, polymer rods from preparatory example 4 were heated to 55° C. and elongated over the course of 2 minutes to 100% elongation. Rods were allowed to cool slightly before removing from the Sintech grips. The diameter of the rods decreased from 0.24" to 0.18" during the elongation. Six 1.25" pieces were cut from the elongated rods and were inserted between two of the polycarbonate workpieces fabricated in Example 1. The assembly was heated at 90° C. for 30 minutes to allow the fastener to recover the original molded shape. The fastened assembly was tested to failure under tensile loading at 2"/min. The average peak load for 5 samples was 83.7 lbf (372 N), standard deviation of 10.3 lbf, (45.8 N).

Example 9

Shear Performance of Acrylic Fasteners

Clear plastic tubing with length of 5 inches and an inside diameter of 0.25" was sealed on one end using a clip, filled with the acrylic solution of Preparatory Example 4, and then sealed using a second clip in such a way as to exclude air bubble formation inside the tube. The filled tube was placed horizontally under a LED array (3.80 nm, 100 mW/cm$^2$, 10 min) to photocure the sample. Following polymerization, the plastic tubing was cut away from the resulting polymer rod Using a Sintech load frame, polymer rods from preparatory example 4 were heated to 55° C. and elongated over the course of 2 minutes to 50% elongation. Rods were allowed to cool slightly before removing from the Sintech grips. The diameter of the rods decreased from 0.24" to 0.2" during the elongation. Six 0.5" pieces were cut from the elongated rods and were inserted between two of the polycarbonate work pieces fabricated in Example 2. The assembly was heated at 90° C. for 20 minutes to allow the fastener to recover the original molded shape. The fastened assembly was tested to failure under tensile loading at 2"/min. The average peak load for 5 samples was 110.2 lbf (490 n), standard deviation of 9.2 lbf (40.9 N).

Example 10

Thermoplastic Polyurethane Fasteners

DiARY MM9020™ thermoplastic polyurethane shape memory polymer (DiAPLEX Co. Ltd, Tokyo, Japan) was injection molded into a 2.8 mm thick plaque. A portion of this plaque was cut into strips nominally 80 mm long with a rectangular cross-section 2.9 mm×2.8 mm. These strips were heated in a 100° C. oven and stretched by hand to an elongation of approximately 150%. The rectangular cross-section of the samples decreased to 1.8 mm×1.7 mm.

Tensile test specimens were prepared from polypropylene workpieces (88 mm×25 mm×0.6.2 mm) The center of one end of each workpiece (the 25 mm×6.2 mm face) was drilled normal to the surface with a cylindrical cavity (2.3 mm diameter, 13 mm deep). An additional hole (2.3 mm diameter, 7 mm deep) was then drilled in the same location on the sample's face, but at angle that was approximately 15° different from the bore of the original hole. A third hole (2.3 mm diameter, 7 mm deep) was then drilled in the same location, but that was also at an angle approximately 15° different from the bore of the original hole and oriented toward the opposite direction from the second hole. The result of the three drilling steps was a single cavity that was approximately 2.3 mm in diameter at the surface, and between 4 mm and 5 mm wide at a depth 7 mm from the surface.

The elongated polyurethane shape memory polymer samples were cut to a length of 25 mm and inserted into the cavities of two aligned polypropylene coupons. These assemblies were then placed in boiling water for 10 minutes, during which time the fasteners decreased in length and expanded laterally. After cooling to room temperature, the samples were tested under tension at 2"/min. The average peak load for two samples was 22 lbf (97.9 N).

Preparatory Example 5

Dicyclopentadiene-Ethylidenenorbornene Formulation

An oven-dried 125 mL Erlenmeyer flask was capped with a septum and purged with nitrogen. Using a syringe ethylidenenorbornene (23.2 mL, 0.17 mol) and 24.5 mL of the catalyst solution from Preparatory Example 1 were added. ethyltrichloroacetate (0.32 mL, 0.002 mol) was added. This solution is denoted Mixture 4A.

Irganox™ 1010 (0.24 g, Ciba Specialty Chemical Corp, Tarrytown, N.Y.) and Irgafos™ 168 (0.72 g, Ciba) were placed in an oven-dried 125 mL Erlenmeyer flask which was then capped with a septum and purged with nitrogen. Ethylidenenorbornene (35.6 mL, 0.26 mol) was added and the mixture was stirred for several minutes to dissolve the solids. Butyl ether (2.4 mL) and 9.1 mL of a 10 vol % solution of diethylaluminumchloride in dicyclopentadiene were then added. This solution is denoted Mixture 4B.

Example 11

Tensile Testing of ¾ Inch Wood Assemblies

Equal amounts of Mixture 4A and Mixture 4B were each loaded into syringes. The two solutions were injected through a static mixer into a Tygon tube with an inside diameter of 5/16". The sample exothermed and the resulting polymer was removed from the tube and put in a 100° C. oven for approximately 10 minutes to postcure.

This sample was cut into 6 inch (152 mm) pieces. Using a load frame, these pieces were heated to 100° C. and stretched over the course of one minute to 200% elongation to impart the deformed shape. The rod-like samples were allowed to cool partially before removing them from the grips of the load frame. This material was cut into pieces 1.1" (29 mm) long.

Oak workpieces (3×1×¾ inch, approx. 76.2×25.4×19.1 mm) with grain parallel to the 3 inch (76.2 mm) dimension were drilled to provide a cavity ⅝ inch (15.9 mm) deep and 13/64 inch (5.16 mm) in diameter. The cavity was in the center of the smallest face of the workpieces. A high speed cutting bit (Dremel™ #192) was then used to increase the diameter of the cavity in the entire region farther that than ⅛ inch (3.2 mm) from the opening of the cavity. An elongated fastener as described in the previous paragraph was inserted into the aligned cavities of two workpieces. The assembly was heated in a 120° C. oven for 40 minutes, during which time the fastener decreased in length and increased in diameter as it recovered (in part) the original, permanent shape. Three such samples were prepared.

To allow for tensile testing, the samples were pin loaded in a load frame through 8 mm diameter holes drilled through each workpiece. The samples were tested to failure at 2 inches/min (51 mm/min). The average peak load for three samples was 313 lbf (1390 N).

Example 12

Tensile Testing of Wood Assemblies with Tapered Cavities

Oak workpieces (3×1×½ inch, approx. 76.2×25.4×12.7 mm) with grain parallel to the 3 inch (76.2 mm) dimension were drilled to provide a cavity ⅝ inch (15.9 mm) deep and 13/64 inch (5.16 mm) in diameter. The cavity was in the center of the smallest face of the workpieces. A high speed cutting bit (Dremel #192) was then used to increase the diameter of the cavity only in the plane parallel to the largest face of the work piece and farther than ⅛ inch (3.2 mm) from the opening of the cavity. An elongated fastener as described in Example 12 was inserted into the aligned cavities of two workpieces. The assembly was heated in a 145° C. oven for 20 minutes, during which time the fastener decreased in length and increased in diameter as it recovered (in part) the original, permanent shape. Eight such samples were prepared.

To allow for tensile testing, the samples were pin loaded in a load frame through 8 mm diameter holes drilled through each workpiece. The samples were tested to failure at 2 inches/min (51 mm/min). The average peak load for eight samples was 177 lbf (787 N) (standard deviation of 48 lbf, 214 N).

Example 13

Assemblies of Polycarbonate with Induction Heating

The smallest face (1"×⅜", approx. 25.4×9.5 mm) of twelve polycarbonate workpieces (3×1×⅜ inches, approx. 76.2×25.4×9.5 mm) was drilled normal to the surface with a cylindrical cavity ⅝ inches deep (15.9 mm) and 3/16 inch (4.8 mm) in diameter. An additional hole (4.8 mm diameter, 15.9 mm deep) was then drilled in the same location on the sample's face, but at angle that was approximately 15° different from the bore of the original hole. A third hole (4.8 mm diameter, 15.9 mm deep) was then drilled in the same location, but that was also at an angle approximately 15° different from the bore of the original hole and oriented toward the opposite direction from the second hole.

Elongated fasteners as described in Example 12 were wrapped with aluminum foil 0.001 inches (0.025 mm) thick. The fasteners were inserted into the aligned cavities of two workpieces. The center of the assembly was placed near the coil of a Mini-Ductor induction heater (Model # IDIMD-600). The coil was flat with four complete turns and diameter of approximately 1.5 inches (38 mm) The induction heater was activated for 45 seconds during which time the fastener decreased in length and increased in thickness as it recovered (in part) the original, permanent shape. Four such samples were prepared. After cooling, they were tested to failure with an average peak load of 116 lbf (516 N).

What is claimed is:
1. A method of fastening comprising
   a) providing first and second workpieces, each workpiece having a cavity defining an opening in a surface of each workpiece;
   b) inserting a fastener into the respective cavity and opening, wherein the fastener comprises an oriented shape memory polymer, c) heating the fastener so that the fastener expands laterally to engage the cavities of the workpieces, and shrinks along the longitudinal axis to draw the workpieces together.

2. The method of claim 1 further comprising one or more additional workpieces having a through-hole therein, said additional workpiece(s) inserted between the first and second workpieces.

3. The method of claim 1 wherein the fastener is rod shaped.

4. The method of claim 1 wherein the openings of the cavities are round.

5. The method of claim 1 wherein the fastener is axially oriented at least 50%.

6. The method of claim 1 wherein the shape memory polymer is a crosslinked thermoset polymer.

7. The method of claim 6 wherein the crosslinked thermoset polymer is a dicyclopentadiene copolymer.

8. The method of claim 1 wherein the shape memory polymer is a crystalline thermoplastic polymer.

9. The method of claim 1 wherein said shape memory polymer has an elastic modulus of at least 90 MPa at 0° C. and an elastic modulus of at least 0.5 MPa at 80° C.

10. The method of claim 1 wherein the fastener is prepared by the steps of
casting the shape memory polymer into a mold, allowing it to cure to produce a shaped article and deforming the resulting shaped article at a temperature below the $T_{trans}$.

11. The method of claim 1 wherein the fastener is prepared by the steps of casting the shape memory polymer into a mold, allowing it to cure to produce a shaped article and deforming the shaped article at a temperature above the $T_{trans}$, then cooling the resulting deformed article below the $T_{trans}$ of the polymer to maintain the shape of the deformed article.

12. The method of claim 1 wherein said cavity has a first width at the surface of the workpiece and a second larger width adjacent the first width.

13. The method of claim 1 wherein the depth of the cavities of the first and second workpieces are from 10 to 90% of the thickness of the workpiece, perpendicular to the plane of the opening of the cavity.

14. The method of claim 1 wherein the length of the fastener is greater than the depth of the first cavity and equal to or less than the combined depth of the first and second cavities.

15. The method of claim 1 wherein each of said cavities have an opening on a surface of the workpiece and a blind, distal end.

16. The method of claim 15 wherein the width of the distal end of the cavity is greater than the radius at the opening.

17. The method of claim 15 wherein the fastener expands laterally upon heating, the ends thereof form a shoulder in the blind end.

18. The method of claim 1 wherein the fastener further comprises a resistive heating element embedded therein.

19. The method of claim 1 wherein the width of the cavity at the opening is 100 to 200% of the width of the fastener.

20. The method of claim 1 wherein the fastener further comprises a conductive sleeve, which is heated through induction heating.

* * * * *